March 30, 1965 D. W. L. CLAMP 3,175,631
WEIGHING APPARATUS
Filed June 19, 1963

3,175,631
WEIGHING APPARATUS

David Warwick Lloyd Clamp, Knowle, England, assignor to Joseph Lucas (Industries) Limited, Birmingham, England
Filed June 19, 1963, Ser. No. 289,113
Claims priority, application Great Britain, June 25, 1962, 24,270/62
6 Claims. (Cl. 177—46)

This invention relates to weighing apparatus of the kind arranged to give an indication when the weight of an article is below a first predetermined value or above a second predetermined value.

According to the invention, weighing apparatus of the kind specified includes at least one load cell for producing an A.C. signal of amplitude dependent upon the weight of an article being measured, means for subtracting from the load cell output A.C. signals of opposite half-cycles of the same polarity as said opposite half-cycles respectively but of amplitude corresponding to the maximum and minimum predetermined weights of an article, whereby the resultant signal will consist of half-cycles of one polarity only when the weight of the article lies between said predetermined weights, a diode through which the resultant signal is fed, said diode preventing passage therethrough of signals of said one polarity, and a phase-sensitive detector for detecting the phase of any signals of the opposite polarity passing through the diode, and producing one of two signals depending on whether an article is overweight or underweight.

Figure 1:
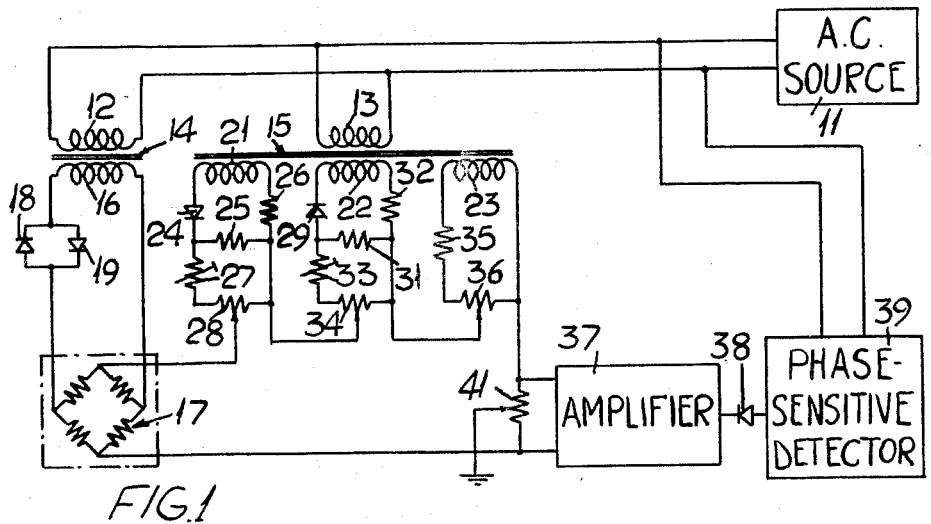
Figure 2:
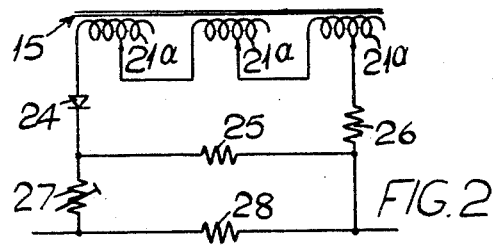

In the accompanying drawings, FIGURE 1 is a circuit diagram illustrating one example of the invention, and FIGURE 2 is a fragmentary circuit diagram illustrating a modification of part of FIGURE 1.

Referring to FIGURE 1, there is provided an A.C. source 11 which supplies power to the primary windings 12, 13 of a pair of transformers 14, 15. The transformer 14 has a secondary winding 16 one end of which is connected to one input terminal of a load cell 17, and the other of which is connected to the other input terminal of the load cell through a pair of oppositely connected diodes 18, 19 in parallel. The load cell 17 is subjected in use to the weights of articles the weight of which is to be tested, so that the output from the load cell is an A.C. signal of amplitude dependent on the weight of the article. Although a single load cell is illustrated, in practice a number of load cells will normally be used, connected either in series or in parallel.

The transformer 15 has three secondary windings 21, 22, 23. The ends of the winding 21 are connected through a series circuit including the anode and cathode of a diode 24 and resistors 25, 26 the resistor 25 being bridged by a variable resistor 27 and a resistor 28 in series. Moreover, the ends of the winding 22 are connected through a series circuit including the cathode and anode of a diode 29 and resistors 31, 32 the resistor 31 being bridged by a variable resistor 33 and a resistor 34 in series. The ends of the winding 23 are connected through resistors 35, 36 in series.

One output terminal of the load cell 17 is connected to one input terminal of an amplifier 37 whilst the other output terminal of the load cell is connected to the other input terminal of the amplifier through variable portions of the resistors 28, 34, 36. The output from the amplifier is fed through the cathode and anode of a diode 38 to a phase-sensitive detector 39 which receives an additional input from the A.C. source 11.

In use, the signal appearing across the resistor 28 consists of the positive half-cycles of the A.C. supply, the amplitudes of the portions of these half-cycles which are passed to the amplifier 37 being adjusted by means of the resistor 27 and the tapping point on the resistor 28 to be equal to the amplitude of signals from the load cell 17 corresponding to the maximum permissible weight of an article. In a similar manner, the amplitude of the negative half-cycles passed on from the resistor 34 to the amplifier 37 is chosen to correspond to the minimum permissible weight of the article. The purpose of the variable tapping point on the resistor 36 is to allow for the unladen weight of a container on which the article is placed, and it is to be understood that throughout this specification and claims, the term "article" is used in a broad sense to include not only solid articles but liquids and solids in divided form.

The connections are such that the positive and negative half-cycles of the load cell output are out of phase with the A.C. source, whilst the signals across the resistors 28, 34 are in phase with the positive and negative half-cycles of the A.C. source respectively. These voltages are added and applied to the amplifier 37. It will be appreciated that if the output voltage of the load cell is greater than the minimum permissible voltage but less than the maximum permissible voltage, a series of positive half-cycles will be fed to the amplifier 37. The amplifier output cannot now pass through the diode 38 and so there is no input to the phase-sensitive detector 39. However, if the article is overweight or underweight, positive and negative half-cycles are supplied to the amplifier, and the negative half-cycles of the amplifier output are applied to the detector 39. These half-cycles will be out-of-phase or in phase with the A.C. source 11 depending on whether the article is overweight or underweight, the two conditions producing different output signals from the detector.

The purpose of the diodes 18, 19 is to compensate for changes in voltage drop across the diodes 24, 29 with temperature, the four diodes 18, 19, 24, 29 being mounted in physically close proximity.

Preferably, a resistor 41 is connected across the amplifier 37, and a point intermediate the ends of the resistor 41 is earthed. The purpose of the resistor 41 is to allow for unavoidable capacitive connections between various parts of the circuit and earth. The variable point on the resistor 41 is adjusted when the circuit is installed to compensate for the unavoidable connections. In effect, the resistor completed a bridge circuit and is adjusted so that stray capacitative effects in opposite arms of the bridge cancel each other out.

FIGURE 2 illustrates a modification in which the variable tapping point on the resistor 28 is omitted, the connection from the load cell 17 passing through all of the resistor 28. In place of the winding 21, a number of variable windings 21a are employed to give the variations previously achieved by the variable tapping point. Similar arrangements can be employed in place of the windings 22, 23 and the variable tapping points on the resistors 34, 36.

Having thus described my invention, what I claim as new and desire to secure by Letters Patent is:

1. Weighing apparatus of the kind arranged to give an indication when the weight of an article is below a first predetermined value or above a second predetermined value, said apparatus including in combination an A.C. source, a load cell connected to said A.C. source, said load cell producing an A.C. signal of amplitude dependent upon the weight of an article being measured, means deriving from said A.C. source first and second A.C. signals of the same polarity as opposite half-cycles respectively of the output from said load cell, but of amplitudes corresponding to the maximum and minimum predetermined weight of an article, means in circuit with said load cell for subtracting said first and second signals from said opposite half-cycles of the output from said load cell, so producing a resultant signal which consists of half-cycles of one polarity only when the weight of said article lies between said predetermined weights, a diode through which the resultant signal is fed, said diode perventing passage therethrough of signals of said one polarity, and a phase-sensitive detector for detecting the phase of any signals of the opposite polarity passing through the diode, and producing one of two signals depending on whether an article is overweight or underweight.

2. Weighing apparatus as claimed in claim 1 in which the signals to be subtracted from the load cell output are obtained from the secondary windings of transformers fed by the same A.C. source as the load cell, the secondary windings having in circuit therewith diodes connected to provide signals of the required polarity, and means in circuit with said secondary windings for varying the amplitudes of the signals.

3. Weighing apparatus as claimed in claim 2 including a pair of oppositely connected diodes connected in parallel in the input circuit to the load cell and situated in close proximity to the diodes in circuit with said secondary windings so as to compensate for temperature changes.

4. Weighing apparatus as claimed in claim 3 including means in circuit with said transformers for compensating for the weight of a container in which the article to be weighed is placed.

5. Weighing apparatus as claimed in claim 4 including an amplifier through which signals from the load cell are passed to the phase-sensitive detector.

6. Weighing apparatus as claimed in claim 5 including a resistor connected across the amplifier and having a point intermediate its ends earthed.

References Cited by the Examiner
UNITED STATES PATENTS

| | | | |
|---|---|---|---|
| 2,733,911 | 2/56 | Thurston | 177—211 |
| 2,766,981 | 10/56 | Lauler et al. | 177—211 |
| 2,868,491 | 1/59 | Thorsson et al. | 177—211 |
| 2,938,701 | 5/60 | Thorsson et al. | 177—211 |
| 2,950,437 | 8/60 | Stahl | 235—179 |
| 3,112,805 | 12/63 | Williams | 177—46 |

LEO SMILOW, *Primary Examiner.*